United States Patent
Kimura

(10) Patent No.: US 8,279,476 B2
(45) Date of Patent: Oct. 2, 2012

(54) INPUT DEVICE, AND MULTI-FUNCTION PERIPHERAL

(75) Inventor: Masahiko Kimura, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 578 days.

(21) Appl. No.: 12/510,732

(22) Filed: Jul. 28, 2009

(65) Prior Publication Data

US 2010/0027064 A1    Feb. 4, 2010

(30) Foreign Application Priority Data

Jul. 31, 2008   (JP) ................................. 2008-198254

(51) Int. Cl.
  G06K 15/00   (2006.01)
  G06F 3/12    (2006.01)
  G06F 3/02    (2006.01)
  G06F 3/041   (2006.01)
  G06F 3/042   (2006.01)
  G06F 3/043   (2006.01)
  G06F 3/045   (2006.01)

(52) U.S. Cl. ..................... 358/1.15; 358/1.12; 358/1.13; 358/1.14; 358/1.16; 358/1.18; 345/171; 345/172; 345/173; 345/174; 345/175; 345/176; 345/177; 345/178

(58) Field of Classification Search ........................ None
See application file for complete search history.

(56) References Cited

U.S. PATENT DOCUMENTS

2003/0012579 A1* 1/2003 Takahashi et al. .............. 399/81
2006/0171734 A1* 8/2006 Maeda ............................ 399/81

FOREIGN PATENT DOCUMENTS

| | | |
|---|---|---|
| JP | H08-016296 A | 1/1996 |
| JP | H11-039093 A | 2/1999 |
| JP | H11-321021 A | 11/1999 |

(Continued)

OTHER PUBLICATIONS

Someya Akihiko; "Control Panel"; JP Pub Date Jan. 1996; Machine Translation in English of JP Puib No. 08-016296.*

(Continued)

*Primary Examiner* — Benny Q Tieu
*Assistant Examiner* — Haris Sabah
(74) *Attorney, Agent, or Firm* — Baker Botts L.L.P.

(57) ABSTRACT

An input device including a frame in the form of a rectangular parallelepiped body which is supported by a base and which is movable between a first angular position in which an angle of a lower surface of the frame with respect to a horizontal upper surface of the base is smaller than a predetermined threshold value, and a second angular position in which the angle of the lower surface of the frame as seen in the first angular position with respect to the horizontal upper surface of the base is not smaller than the threshold value, a first input portion disposed on an upper surface of the frame as seen when the frame has a horizontal posture in the first angular position, in which a lower surface of the frame is parallel to the horizontal upper surface of the base, a second input portion disposed on a side surface of the frame as seen when the frame has the horizontal posture; and a detecting portion configured to detect an operation by an operator of the input device on at least one of the first and second input portions.

20 Claims, 10 Drawing Sheets

FOREIGN PATENT DOCUMENTS

| | | |
|---|---|---|
| JP | 2002-077357 A | 3/2002 |
| JP | 2003-345500 A | 12/2003 |
| JP | 2007-109082 A | 4/2007 |
| JP | 2008-160619 A | 7/2008 |

OTHER PUBLICATIONS

Japan Patent Office; Notification of Reason for Refusal in Japanese Patent Application No. 2008-198254 (counterpart to the above-captioned US Patent Application) mailed on Jun. 22, 2010.

* cited by examiner

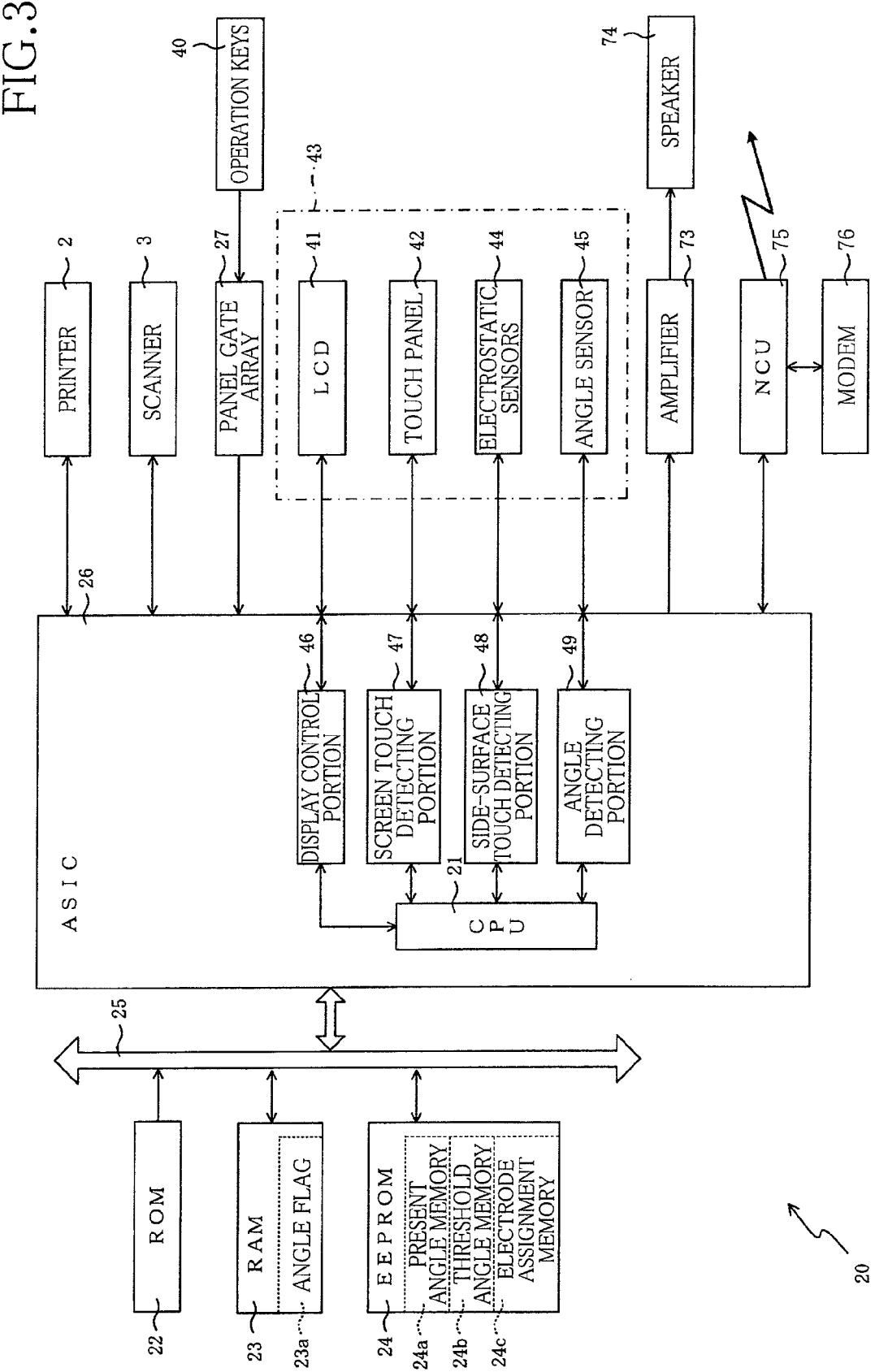

FIG.4

| ELECTRODES | BUTTON IMAGES | DISPLAY POSITIONS |
|---|---|---|
| FIRST ELECTRODE | PAPER BUTTON | Z (X1, Y1) |
| SECOND ELECTRODE | MAGNIFICATION BUTTON | Y (X2, Y2) |
| THIRD ELECTRODE | NUMBER OF COPIES BUTTON | X (X3, Y3) |
| FOURTH ELECTRODE | CONCENTRATION BUTTON | W (X4, Y4) |

<ATTENTION>
OPERATE THE BUTTONS ON THE SIDE SURFACES.
THE DISPLAYED BUTTONS CANNOT BE OPERATED.

INPUT DEVICE, AND MULTI-FUNCTION PERIPHERAL

CROSS REFERENCE TO RELATED APPLICATION

The present application claims the priority from Japanese Patent Application No. 2008-198254 filed Jul. 31, 2008, the disclosure of which is herein incorporated by reference in its entirety.

BACKGROUND OF THE INVENTION

1. Field of the Invention

The present invention relates to an input device, and a multi-function peripheral provided with the input device.

2. Description of Related Art

There is known an input device including a liquid crystal display (hereinafter abbreviated as "LCD") operable to display images and provided with a touch panel that permits the user or operator to select one of the displayed images, for inputting a command to perform a processing operation assigned to the selected image.

JP-11-321021 A discloses a photographic image printing apparatus 1 having an input device provided with a touch panel 20, which is pivotable to a desirable angular position relative to a casing 11 of a main body 10 of the photographic image printing apparatus.

JP-2007-109082 A discloses a technique relating to touch panel selection of one of images displayed on an LCD, wherein a pressure acting on the touch panel as a result of a finger pressing action of the operator onto the touch panel is detected, and the detected pressure is compared with a threshold value, so that if the detected pressure is lower than the threshold value, this threshold value is lowered to adapt the touch panel selection to the operator who manipulates the touch panel with a smaller force of contact.

SUMMARY OF THE INVENTION

The present invention was made in an effort to solve the problems described above. It is therefore a first object of the present invention to provide an input device which permits correct, easy and highly responsive input of a command equivalent to a command inputted by finger touch with a command image displayed on a display portion. A second object is to provide a multi-function peripheral provided with such an input device.

The first object indicated above can be achieved according to a first aspect of the present invention, which provides an input device comprising: a frame in the form of a rectangular parallelepiped body which is supported by a base and which is movable between a first angular position in which an angle of a lower surface of the frame with respect to a horizontal upper surface of the base is smaller than a predetermined threshold value, and a second angular position in which the angle of the lower surface of the frame as seen in the first angular position with respect to the horizontal upper surface of the base is not smaller than the threshold value; a first input portion disposed on a surface of the frame, which surface is an upper surface of the frame as seen when the frame has a horizontal posture in the first angular position, in which a lower surface of the frame is parallel to the horizontal upper surface of the base; a second input portion disposed on a surface of the frame, which surface is a side surface of the frame as seen when the frame has the horizontal posture; and a detecting portion configured to detect an operation by an operator of the input device on at least one of the first and second input portions.

In the input device constructed according to the first aspect of this invention, the first and second input portions are provided on the frame. The first input portion is disposed on the upper surface of the frame as seen when the frame has the horizontal position in the first angular position, in which the lower surface of the frame is parallel to the horizontal upper surface of the base. On the other hand, the second input portion is disposed on the side surface of the frame as seen when the frame has the horizontal posture. Accordingly, the first input portion is easily operable by the operator when the frame is placed in the first angular position, while the second input portion is easily operable by the operator when the frame is placed in the second angular position. Thus, the input operation by the operator of the input device can be easily and correctly performed irrespective of whether the frame is in the first or second angular position.

The second object can be achieved according to a second aspect of this invention, which provides a multi-function peripheral provided with an input device constructed according to the first aspect of this invention described above.

The multi-function peripheral according to the second aspect of this invention has substantially the same advantages as the input device constructed according to the first aspect of the invention.

BRIEF DESCRIPTION OF THE DRAWINGS

The above and other objects, features, advantages and technical and industrial significance of the present invention will be better understood by reading the following detailed description of preferred embodiments of the present invention, when considered in connection with the accompanying drawings, in which:

FIG. 3 is a block diagram schematically showing an arrangement of a control portion of the multi-function peripheral;

FIG. 4 is a view indicating an electrode assignment table stored in an electrode assignment memory of EEPROM of the control portion;

DETAILED DESCRIPTION OF THE PREFERRED EMBODIMENTS

Figure 1:
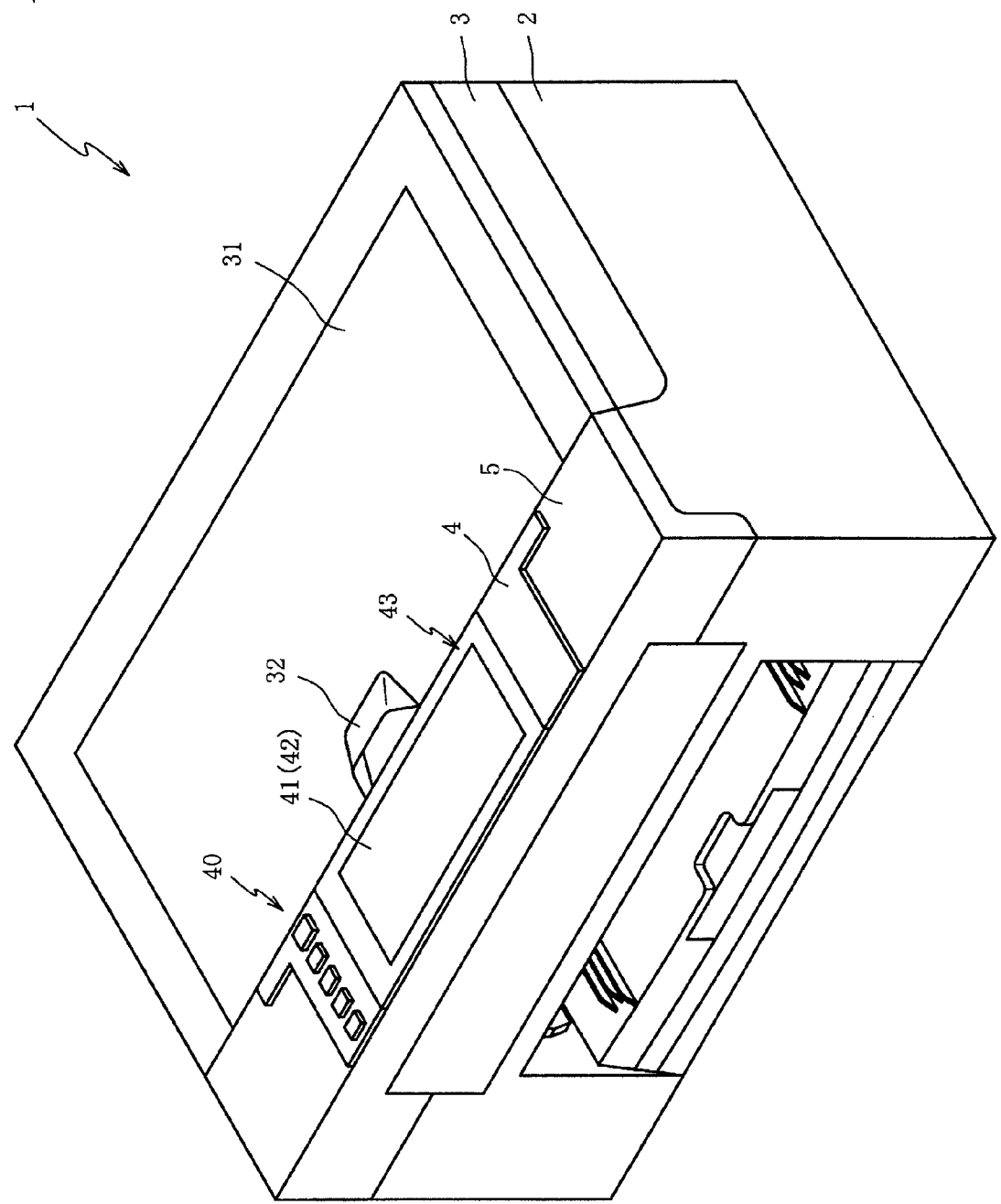
FIG. 1 is a perspective view of a multi-function peripheral constructed according to a first embodiment of this invention.

Preferred embodiments of the present invention will be described by reference to the drawings. The perspective view of FIG. 1 shows an arrangement of a multi-function peripheral 1 (hereinafter abbreviated as "MFP 1") constructed according to the first embodiment of this invention.

The MFP 1 has a plurality of functions including a telephone function, a facsimile (telecopier) function, a printing function and a copying function. In particular, this MFP 1 is characterized by its arrangement that permits correct, easy and highly responsive input of a command equivalent to a command inputted by finger touch with each of button images (command images) displayed on a liquid crystal display 41 (hereinafter abbreviated as "LCD 41").

The MFP 1 has a generally box construction, incorporating a printer 2 in its lower part, a scanner 3 in its upper part, and an operation panel 4 in front of the scanner 3. The printer 2 is configured to print images on a recording medium such as sheets of paper, while the scanner 3 is configured to read an original that carries a desired image or images. The operation panel 4 has various operation keys 40, and the LCD 41.

The LCD 41 is provided with a first input portion in the form of an integrally formed touch panel 42 well known in the art. When one of the button images displayed on the LCD 41 is selected by finger touch with the touch panel 42 by the operator, coordinate values of a position on the LCD 41 at which the selected image is located are detected, and the selected button image is specified or recognized on the basis of the detected coordinate values. The "finger touch" means either a touch of an operator's finger with the selected button image or an approach of the finger to the selected button image.

Figure 2A:
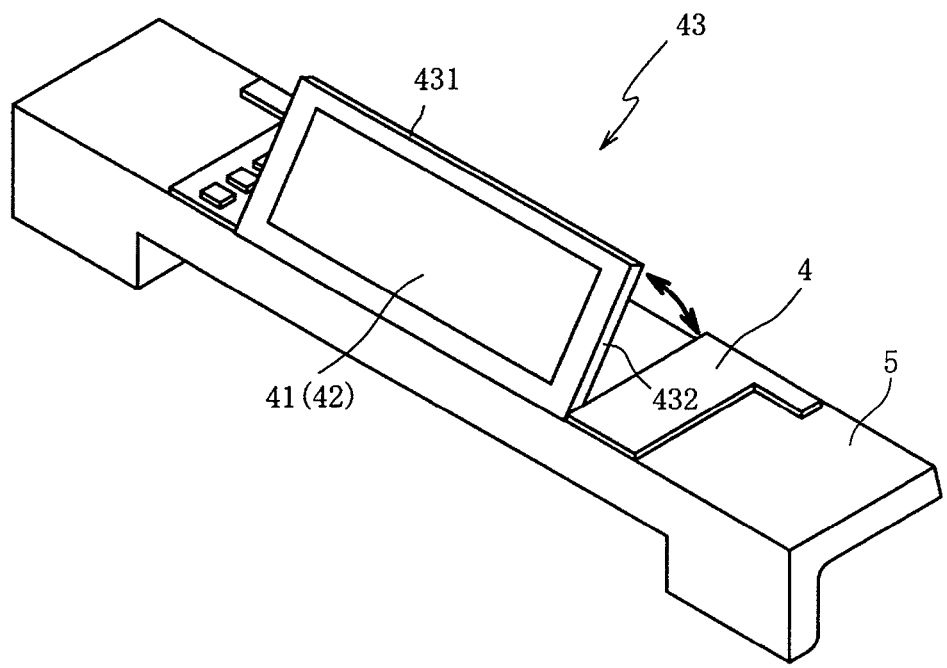
FIG. 2A is an enlarged perspective view showing an arrangement of an operation panel of the multi-function peripheral.

Referring to the enlarged perspective view of FIG. 2A, there is shown an arrangement of the operation panel 4. The LCD 41 (touch panel 42) is held or supported by a LCD frame 43. The LCD frame 43 is pivotable from its horizontal position of FIG. 1 to a desired obliquely inclined position of FIG. 2A, as indicated by arrows in FIG. 2A. The LCD frame 43 has a horizontal posture in the horizontal position, and an obliquely inclined posture in the obliquely inclined position. In the horizontal position, the front surface (upper surface) of the LCD frame 43 in which the LCD 41 is open faces upwards. In the obliquely inclined position, the LCD frame 43 has a desired angle with respect to the upper surface of the operation panel 4, which lies in the horizontal plane.

The LCD frame 43 is a rectangular parallelepiped body having the above-described front surface (upper surface as seen in the horizontal position) in which the LCD 41 is open, and a back surface (lower surface) opposite to the front surface. The back or lower surface has the largest surface area. The operation panel 4 is disposed on the upper surface of a base 5 which is an upper part of the main body of the MFP 1. The LCD frame 43 is pivotally hinged to the base 5. In the horizontal position of the LCD frame 43, the lower surface of the rectangular parallelepiped body of the LCD frame 43 faces the upper surface of the base 5.

The LCD frame 43 is accommodated in a recess formed in the operation panel 4 such that the front surface of the LCD frame 43 in which the LCD 41 (touch panel 42) is open is substantially flush with the upper surface of the operation panel 4 when the LCD frame 42 has the horizontal posture of FIG. 1.

Adjacent to the operation panel 4, there is disposed an original cover 31 such that the original cover 31 lies on a glass plate of the scanner 3, on which the original is placed. The original cover 31 is provided with a knob 32 at its end adjacent to the operation panel 4. In the horizontal position of the LCD frame 43, a first side surface 431 (upper surface as seen in FIG. 2A) of the LCD frame 43 faces the knob 32. When the operator pivots the LCD frame 43 from the horizontal position of FIG. 1 to the desired obliquely inclined posture of FIG. 2A by an appropriate angle, a hand of the operator is inserted into a space within the knob 32 such that the palm of the hand faces down, and the hand is moved upwards and backwards toward the operator, with the fingers of the hand being held in touch with the first side surface 431. By pushing the LCD frame 43 at its upper portion toward the knob 32, the LCD frame 43 can be restored from the obliquely inclined position of FIG. 2A back to the horizontal position of FIG. 1.

The LCD frame 43 is provided with an angle sensor 45 (indicated in FIG. 3) operable to detect an angle of the LCD frame 43 in the obliquely inclined position with respect to the upper surface of the operation panel 4. In the horizontal position, the LCD frame 43 is considered to have an angle of zero degree. The LCD frame 43 is further provided with a second input portion in the form of two electrostatic sensors 44 respectively disposed on the above-indicated first side surface 431 and a second side surface 432 (right side surface as shown in FIG. 2A). It is noted that the first and second side surfaces 431 and 432 are the side surfaces of the LCD frame 43 when the LCD frame 43 is placed in the horizontal position having the horizontal posture.

Figure 2B:
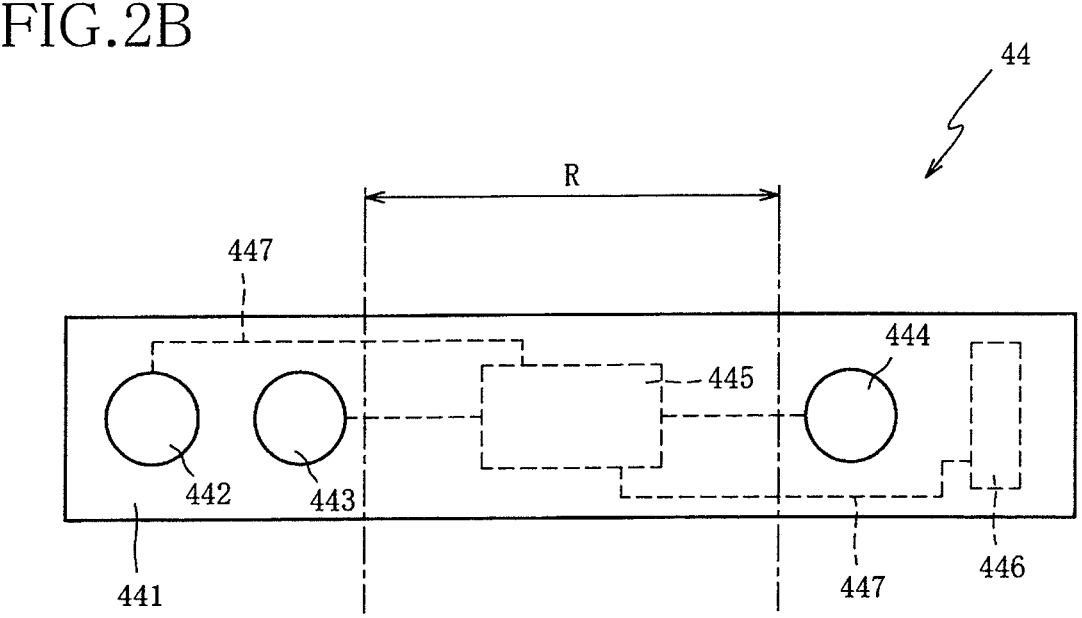
FIG. 2B is a plan view of an electrostatic sensor disposed on a first side surface of a frame of a liquid crystal display of the multi-function peripheral.

The plan view of FIG. 2B shows the electrostatic sensor 44 disposed on the first side surface 431 of the LCD frame 43. The electrostatic sensor 44 is principally constituted by: a substrate 441; three electrodes consisting of a first electrode 442, a second electrode 443 and a third electrode 444 that are printed on one of opposite major surfaces of the substrate 441; and a detecting IC 445 and a connector 446 that are formed on the other major surface of the substrate 441. The electrodes 442, 443, 444, detecting IC 445 and connector 446 are connected to each other by printed wiring lines 447. The electrostatic sensor 44 disposed on the second side surface 432 has a fourth electrode 448.

The arrangement of the electrostatic sensor 44 on the first side surface 431 is not limited to that described above by reference to FIG. 2B. For instance, the detecting IC 445 and connector 446 may be formed on a substrate other than the substrate 441. The configuration and positions of the electrodes 442-444, 448 are not limited to those shown in FIG. 2B, provided the finger touch of the operator with each of the electrodes 442-444, 448 can be detected.

When the operator finger-touches the first electrode 442 of the electrostatic sensor 44, for example, the detecting IC 445 detects an amount of change of electrostatic capacity generated between the first electrode 442 and the finger. An output signal of the detecting IC 445 which corresponds to the detected amount of change of the electrostatic capacity is fed through the connector 446 to an ASIC 26 (which will be described below by reference to the block diagram of FIG. 3), so that the finger touch with the first electrode 442 can be recognized.

As is apparent from FIG. 2B, the electrodes 442-444 are not disposed in a gripping region R of the first side surface 431 at which the LCD frame 43 is gripped by the fingers of the operator when the LCD frame 43 is pivoted from the horizontal position to the obliquely inclined position. In the horizontal position of the LCD frame 43, the gripping region R, which is located between two one-dot chain lines indicated in FIG. 2B, faces the knob 32 of the original cover 31 shown in FIG. 1. Accordingly, the operator does not erroneously touch the electrodes 442-444 when the LCD frame 43 is pivoted from the horizontal position to the obliquely inclined position, with the fingers of the operator being held in touch with the gripping region R. Namely, the gripping region R is located between a left region (as seen in FIG. 2A) of the first side surface 431 in which the first and second electrodes 442, 443 are disposed, and a right region of the first side surface 431 in which the third electrode 444 is disposed. The gripping region R is a region including a central region of the first side surface 431 as seen in its longitudinal direction.

Referring next to the block diagram of FIG. 3, there is schematically shown an arrangement of a control portion 20 of the MFP 1. The control portion 20 includes the above-indicated ASIC (Application Specific Integrated Circuit) 26 to which there are connected the printer 2 and scanner 3, and the LCD 41, touch panel 42, electrostatic sensors 44 and angle sensor 45 that are disposed on the LCD frame 43.

The ASIC 26 incorporates a CPU 21 operable to implement a coordinated control operation to control the various functions of the MFP 1. The ASIC 26 further incorporates a display control portion 46, a screen touch detecting portion 47, a side-surface touch detecting portion 48 and an angle detecting portion 49, which are connected to the CPU 21.

The display control portion 46 is connected to the LCD 41, to control an image displaying operation of the LCD 41. The screen touch detecting portion 47 is connected to the touch panel 42, to detect the coordinates of an operator's touch position on the LCD 41 on the basis of signals generated from the touch panel 42. The side-surface touch detecting portion 48 is connected to the electrostatic sensors 44 disposed on the first and second side surfaces 431, 432 of the LCD frame 43. On the basis of signals generated from the electrostatic sensor 44 on the first and second side surfaces 431, 432 the side-surface touch detecting portion 48 detects one of the electrodes 442-444, 448 of the electrostatic sensor 44, which the operator's finger has touched. The angle detecting portion 49 is connected to the angle sensor 45, to detect the angle of the LCD frame 43 (a change of the angle as a result of a pivotal movement of the LCD frame 43), on the basis of a signal generated by the angle sensor 45. The angle detecting portion 49 cooperates with the angle sensor 45 to function as an angular-position determining portion configured to determine whether the LCD frame 43 is placed in the first or second angular position.

To the ASIC 26, there are also connected a panel gate array (panel GA) 27, an amplifier 73, and an NCU 75. A speaker 74 is connected to the amplifier 73, and a MODEM 76 is connected to the NCU 75. Further, a ROM 22, a RAM 23 and an EEPROM 24 are connected to the ASIC 26 through an external bus 25.

The ROM 22 stores control programs for controlling the various operations of the MFP 1, and the RAM 23 has an angle flag 23a which indicates whether the angle of the LCD frame 43 is equal to or larger than a predetermined threshold value. For instance, the threshold value of the angle is about 45°. However, the threshold value may be selected within a range of 10°-80°, and preferably within a range of 20°-70°. The angle flag 23a is set to an ON state when the angle of the LCD frame 43 is equal to or larger than the threshold value, that is, when the LCD frame 43 is inclined with respect to the upper surface of the operation panel 4, by an angle equal to or larger than the threshold value. The angle flag 23a is set to an OFF state when the angle of the LCD frame 43 is smaller than the threshold value.

The EEPROM 24 has a present angle memory 24a, a threshold angle memory 24b and an electrode assignment memory 24c. The present angle memory 24a stores the present angle of the LCD frame 43 with respect to the upper surface of the operation panel 4. The threshold angle memory 24b stores the predetermined threshold value of the angle of the LCD frame 43. This threshold value can be changed as desired by the operator. The electrode assignment memory 24c stores an electrode assignment table indicated in FIG. 4.

FIG. 4 schematically shows the electrode assignment table, which indicates a relationship of the electrodes 442-444, 448 of the electrostatic sensors 44 to respective button images (command images) displayed on the LCD 41. When the operator's finger touches the first electrode 442, for example, a command equivalent to a command generated by the finger touch with an image of a corresponding paper button is inputted to the CPU 21 of the ASIC 26 through the side-surface touch detecting portion 48. When each of the electrodes 442-444, 448 is finger-touched, a command equivalent to a command inputted to the CPU 21 when the corresponding button image on the LCD 41 is finger-touched is inputted to the CPU 21.

The button images displayed on the LCD 41 vary depending upon the selected function of the MFP 1 (depending upon a selected one of copying function setting view, a facsimile function setting view and a printing function setting view, which are provided on the LCD 41). Accordingly, different sets of the button images are assigned to the electrodes 442-444, 448, depending upon the selected function of the MFP 1. The electrode assignment table of FIG. 4 indicates the relationship of the electrodes 442-444, 448 to the button images displayed when the copying function setting view is selected.

The electrode assignment table of FIG. 4 also indicates a relationship of the electrodes 442, 443, 444, 448 of the electrostatic sensors 44 and the corresponding button images to the display positions of the button images. For instance, the first electrode 442 corresponds to the image of the paper button, and also corresponds to a display position z (X1, Y1) on the LCD 41 at which the paper button image is displayed. Similarly, the second electrode 443 corresponds to the image of a magnification button, and also corresponds to a display position Y (X2, Y2) on the LCD 41 at which the magnification button image is displayed. Thus, the electrode assignment memory 24c storing the electrode assignment table of FIG. 4 serves as an electrode-position memory portion which stores information indicative of a relation of the electrodes 442-444, 448 with the button images and the positions of the button images.

Figure 5A:
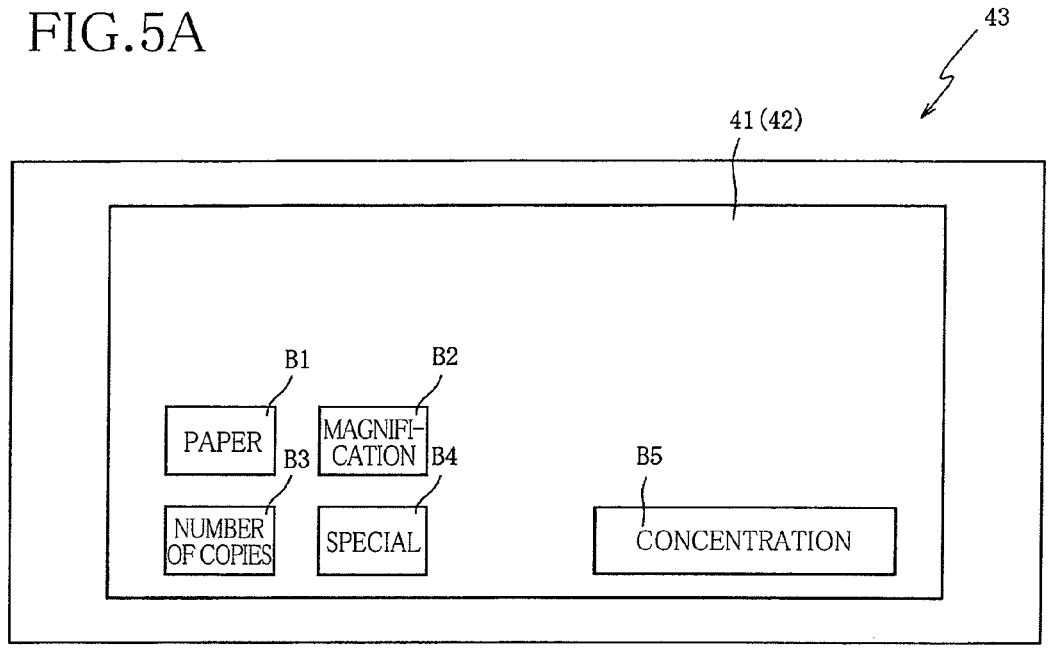
FIG. 5A is a view indicating a first input screen view provided on the liquid crystal display when an angle of the frame of the liquid crystal display with respect to its horizontal position is smaller than a threshold value.
Figure 5B:
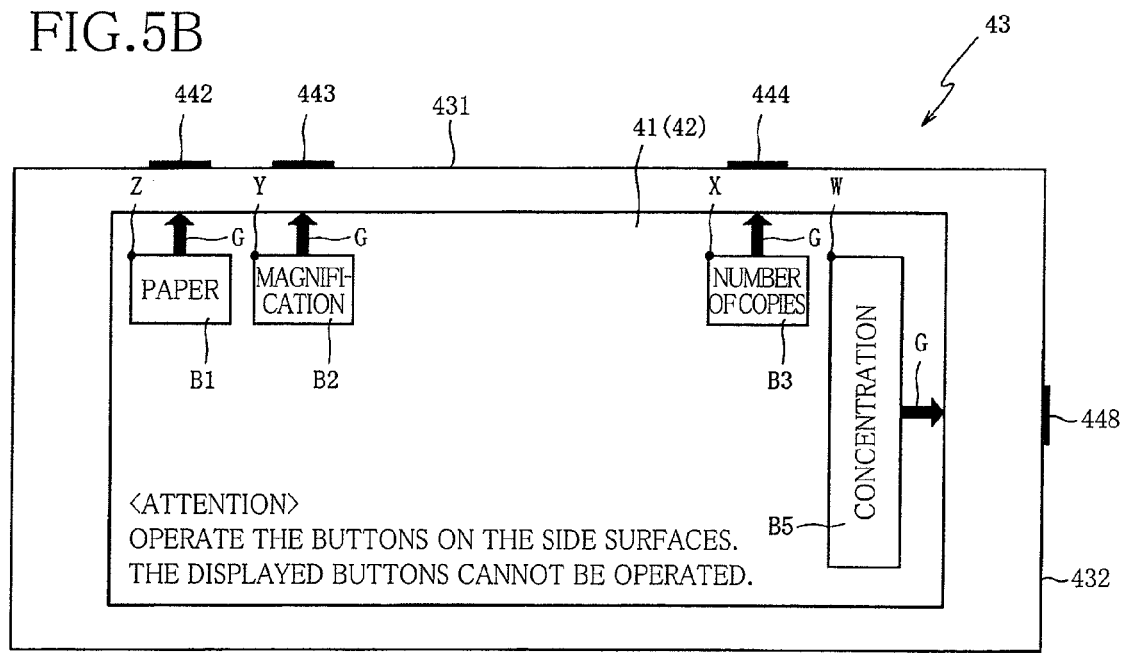
FIG. 5B is a view indicating a second input screen view provided on the liquid crystal display when the angle of the frame is not smaller than the threshold value.

FIG. 5A indicates a first input screen view provided on the LCD 41 when the angle flag 23a is placed in the OFF state, that is, when the angle of the LCD frame 43 is smaller than the threshold value, while FIG. 5B indicates a second input screen view provided on the LCD 41 when the angle flag 23a is placed in the ON state, that is, when the angle of the LCD frame 43 is equal to or larger than the threshold value. When the angle of the LCD frame 43 is smaller than the threshold value, the LCD frame 43 is placed in a first angular position which the LCD frame 43 has the first posture. When the angle of the LCD frame 43 is equal to or larger than the threshold value, the LCD frame 43 is placed in a second angular position in which the LCD frame has the second posture. While the first or second input screen view is provided on the LCD 41, the operator can input a desired command.

The first and second input screen views are selectively provided depending upon the ON or OFF state of the angle flag 23a, that is, depending upon the angle of the LCD frame 43 relative to the predetermined threshold value. FIGS. 5A and 5B indicates the first and second input screen views provided on the LCD 41 when the copying function is set.

In the first input screen view shown in FIG. 5A, there are displayed a PAPER button B1, a MAGNIFICATION button B2, a NUMBER OF COPIES button B3 and a SPECIAL button B4, which are located at a left lower part of the view, and a CONCENTRATION button B5 at a right lower part of the view. The buttons B1 and B2 are respectively located above the buttons B3 and B4.

When the PAPER button B1 is finger-touched, the LCD 41 provides a paper size selecting view in which a desired one of different sizes of the paper sheet can be selected. When the MAGNIFICATION button B2 is finger-touched, the LCD 41 provides a magnification selecting view in which a desired one of different ratios of size magnification of a reproduced image with respect to the original image can be selected. When the NUMBER OF COPIES button B3 is finger-touched, the LCD 41 provides a number of copies selecting view in which a desired number of copies of the reproduced image can be selected. When the SPECIAL button B4 is finger-touched, the LCD 41 provides a special function selecting view in which a desired special function (e.g., "2 in 1" copying function) of the MFP 1 can be selected. The CONCENTRATION button B5 takes the form of a horizontally extending bar for setting the concentration of the reproduced image. The bar is graduated such that the concentration increases in the right direction as seen in FIG. 5A. The desired concentration value is selected by finger-touching the bar at the corresponding position in its longitudinal direction.

As described above, the LCD 41 provides the first input screen view indicated in FIG. 5A, when the angle flag 23a is placed in the OFF state, that is, when the angle of the LCD frame 43 is smaller than the threshold value. When each of the button images in the first input screen view is finger-touched, the command assigned to the finger-touched button image is inputted to the CPU 21 through the screen touch detecting portion 47.

When the angle flag 23a is placed in the ON state, on the other hand, that is, when the angle of the LCD frame 43 is equal to or larger than the threshold value, the LCD 41 provides the second input screen view indicated in FIG. 5B, rather than the first input screen view of FIG. 5A. The button images are provided in the second input screen view according to the electrode assignment table of FIG. 4.

Described in detail, the first electrode 442 corresponds to the PAPER button B1 and the display position Z (X1, Y1), as indicated in FIG. 4, so that the PAPER button B1 is displayed at the position Z (X1, Y1) in the second input screen view on the LCD 41. In addition, an arrow image G is displayed at a position adjacent to the position Z (X1, Y1) of the PAPER button B1, to indicate the position of the first electrode 442 corresponding to the PAPER button B1.

Similarly, the MAGNIFICATION button B2 is displayed at the position Y (X2, Y2) in the second input screen view, and an arrow image G is displayed at a position adjacent to the position Y (X2, Y2) of the MAGNIFICATION button B2, to indicate the position of the second electrode 443 corresponding to the MAGNIFICATION button B2. The NUMBER OF COPIES button B3 is displayed at the position X (X3, Y3), and an arrow image G is displayed at a position adjacent to the position X (X3, Y3), to indicate the position of the third electrode 444 corresponding to the NUMBER OF COPIES button B3. The CONCENTRATION button B5 is displayed at the position W (X4, Y4), and an arrow image G is displayed at a position adjacent to the position W (X4, Y4) corresponding to the CONCENTRATION button B5.

When the angle flag 23a is placed in the ON state, that is, when the angle of the LCD 43 is equal to or larger than the threshold value, the buttons B1, B2, B3 and B5 are invalidated, and cannot be finger-operated. To inform the operator of this fact, the second input screen view includes, at a left lower portion thereof, messages "OPERATE THE BUTTONS ON THE SIDE SURFACES. THE DISPLAYED BUTTONS CANNOT BE OPERATED".

When the first electrode 442 is finger-touched, the paper size selecting view is provided on the LCD 41, as if the PAPER button B1 in the first input screen view was finger-touched. When the second electrode 443 is finger-touched, the magnification selecting view is provided on the LCD 41, as if the MAGNIFICATION button B2 in the first input screen view was finger-touched.

As described above, the LCD 41 provides the second input screen view indicated in FIG. 5B when the angle flag 23a is placed in the ON state, namely, when the angle of the LCD frame 43 is equal to or larger than the threshold value. In this case, the buttons B1, B2, B3 and B5 displayed on the LCD 41 are not finger-operable, but the first, second, third and fourth electrodes 442-444, 448 of the electrostatic sensors 44 on the first and second side surfaces 431, 432 are finger-operable. Thus, the touch panel 42 serves as the first input portion operable when the angle flag 23a is placed in the OFF state. The touch panel 42 is provided on the upper surface of the LCD frame 43 as seen when the LCD frame 43 has the horizontal posture in which the lower surface of the LCD frame 43 is parallel to the horizontal upper surface of the base 5. On the other hand, the electrostatic sensors 44 serve as the second input portion operable when the angle flag 23a is placed in the ON state. The electrostatic sensors 44 are provided on the side surfaces 431, 432 as seen when the LCD frame has the horizontal posture. The second input portion permits correct, easy and highly responsive input of a command equivalent to a command inputted by finger touch with each of the button images (images of the buttons B1, B2, B3 and B5) displayed on the LCD 41.

When the angle of the LCD frame 43 is equal to or larger than the threshold value, the operator has difficulty to finger-touch the buttons B1, B2, B3, B5 displayed in the second input screen view, at the part of the finger between the tip and the first joint. However, the operator can easily finger-touch the electrodes 442-444, 448 of the electrostatic sensors 44 disposed on the first and second side surfaces 431, 432 of the LCD frame 43. Thus, the electrostatic sensors 44 permit correct, easy and highly responsive input of the command equivalent to the command inputted by finger touch with each of the button images displayed on the LCD 41.

The operator has difficulty to recognize the positions of the electrodes 442-444, 448 disposed on the side surfaces 431, 432, when the operator faces the LCD 41. However, the second input screen view includes the arrow images G indicating the positions of the electrodes 442-444, 448, so that the operator can easily recognize the positions of the electrodes 442-444, 448 from the arrow images G. Accordingly, the operator need not move the head to see the side surfaces 431, 432 for easily recognizing the positions of the electrodes 442-444, 448 to finger-touch these electrodes. Thus, the arrow images G (images of arrows) facilitate the operation to touch the electrodes, and serve as electrode-position indicating images indicative of the positions of the electrodes 442-444, 448.

As indicated in FIGS. 5A and 5B, the LCD frame 43 is a rectangular parallelepiped body having a longitudinal direction parallel to the right and left direction as seen in FIGS. 5A and 5B, and the first side surface 431 on which the electrodes 442-444 are disposed extends in the longitudinal direction of the LCD 41, while the second side surface 432 on which the fourth electrode 448 is disposed is perpendicular to the longitudinal direction of the LCD 41.

As indicated in FIG. 5B, the arrow images G are located adjacent to the images of the corresponding buttons B1, B2, B3 and B5 displayed in the first input screen view indicated in FIG. 5A. Accordingly, the operator can easily locate the electrodes 442-444, 448 before finger-touching these electrodes.

The electrode assignment table of FIG. 4 does not list the SPECIAL button B4 in the column of the button images. Accordingly, the image of the SPECIAL button B4 is not provided in the second input screen view.

However, the electrode assignment table can be re-written as desired by the user or operator of the MFP 1. For example, the CONCENTRATION button B5 assigned to the fourth electrode 448 can be changed to the SPECIAL button B4. Thus, button images desired by the user can be assigned to the respective four electrodes 442-444, 448.

The number of the electrodes to be disposed on the side surfaces 431, 432 may be equal to or larger than the maximum number of the button images displayed in one screen view displayed on the LCD 41. Where the surface areas in which the electrodes are displaced are relatively narrow, the electrodes must be disposed relatively close to each other. However, the electrodes are desirably spaced from each other by sufficient spacing distances in order to avoid an erroneous touching operation of the electrodes.

Figure 6:
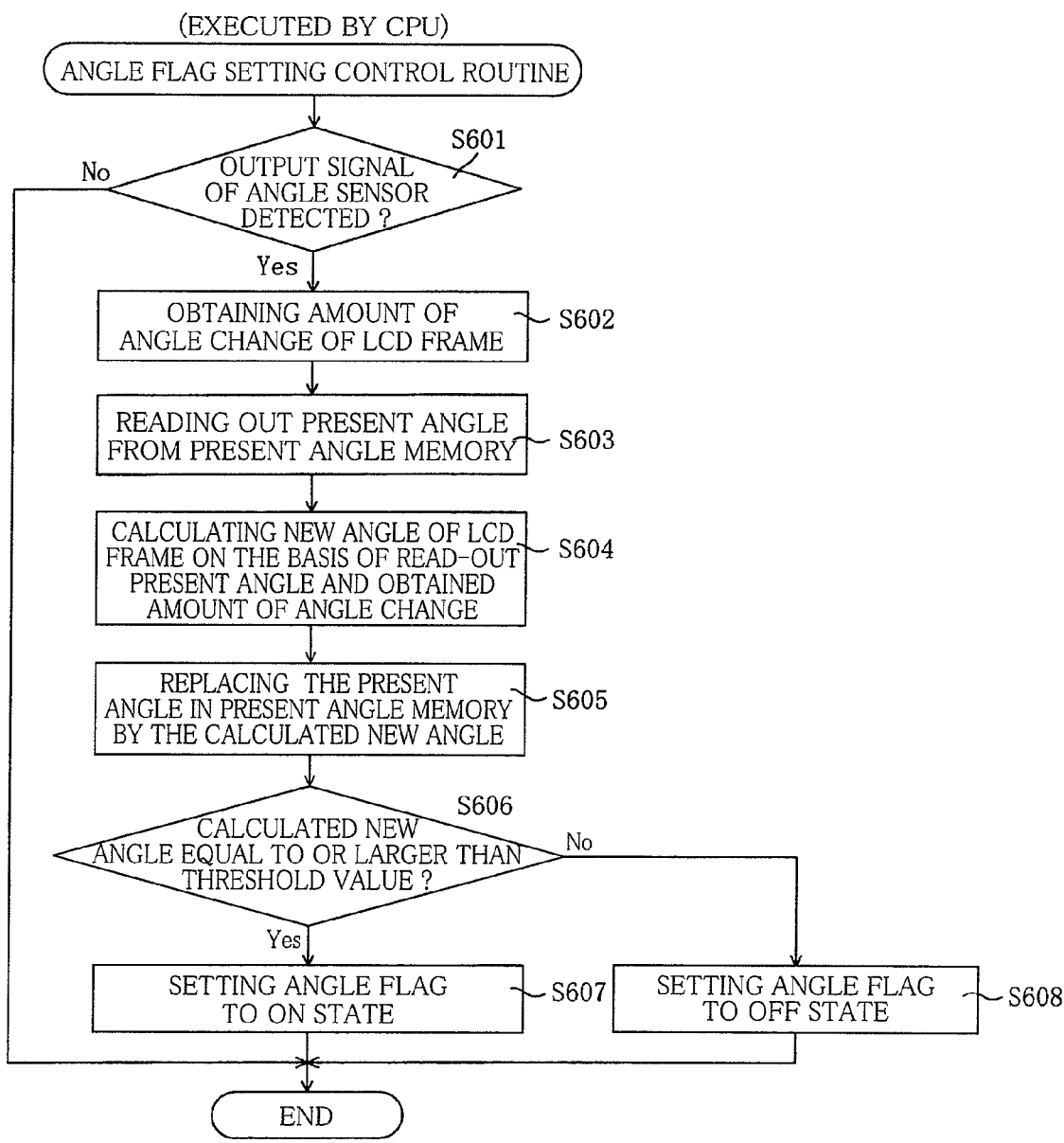
FIG. 6 is a flow chart illustrating an angle flag setting control routine executed in the first embodiment.

Referring next to the flow chart of FIG. 6, there is illustrated an angle flag setting control routine executed by the CPU 21 to set the angle flag 23a selectively to the ON and OFF states.

The control routine of FIG. 6 is initiated with step S601 to determine whether an output signal of the angle sensor 45 has been detected. If a negative determination (NO) is obtained in the step S601, one cycle of execution of the present control routine is terminated. If an affirmative determination (YES) is obtained in the step S601, the control flow goes to step S602 in which an amount of change of the angle of the LCD frame 43 is obtained on the basis of the output signal of the angle sensor 45. The step S602 is followed by step S603 to read out the present angle of the LCD frame 43 from the present angle memory 24a.

Then, the control flow goes to step S604 to calculate the new angle of the LCD frame 43 on the basis of the present angle read out from the present angle memory 24a, and the obtained amount of change of the angle of the LCD frame 43, and to step S605 in which the present angle presently stored in the present angle memory 24a is replaced by the calculated new angle. The control flow then goes to step S606 to determine whether the calculated new angle is equal to or larger than the threshold value stored in the threshold angle memory 24b.

If the calculated new angle of the LCD frame 43 is equal to or larger than the threshold value, that is, if the LCD frame 43 is obliquely inclined by an angle equal to or larger than the threshold angle with respect to the upper surface of the base 5, an affirmative determination (YES) is obtained in the step S606. In this case, the control flow goes to step S607 to set the angle flag 23a to the ON state, and one cycle execution of the present control routine is terminated. If the calculated new angle is smaller than the threshold value, that is, if the LCD frame 43 has the first posture relatively close to the horizontal position in which the LCD 43 lies flat on the base 5, a negative determination (NO) is obtained in step S606. In this case, the control flow goes to step S608 to set the angle flag 23a to the OFF state, and one cycle of execution of the present control routine is terminated. Thus, the angle flag 23a is set to the ON or OFF state, depending upon the detected angle of the LCD frame 43 as compared with the threshold value.

Figure 7:
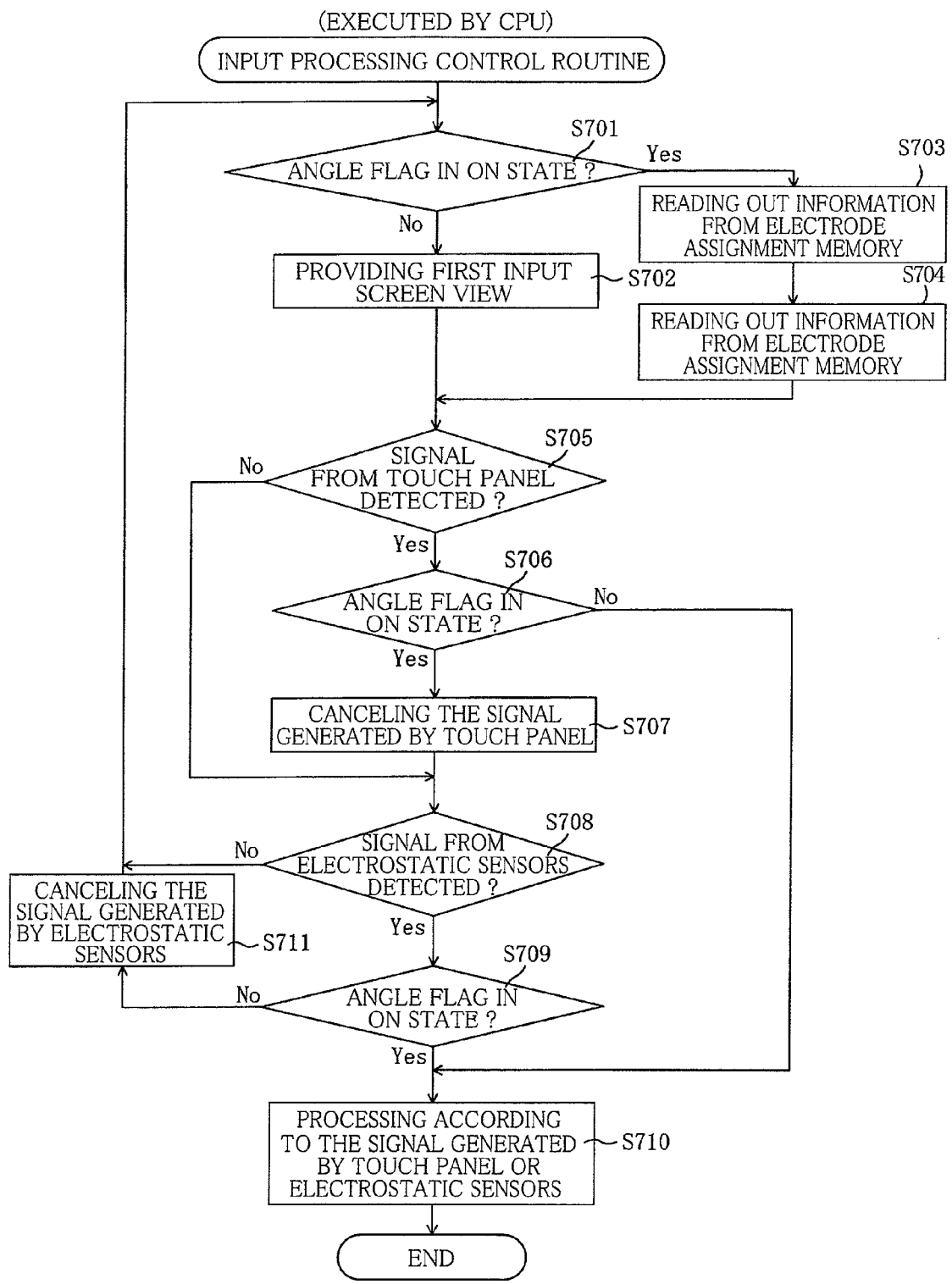
FIG. 7 is a flow chart illustrating an input processing control routine.

The flow chart of FIG. 7 illustrates an input processing control routine also executed by the CPU 21 for entry of commands corresponding to the finger-touched button images displayed on the LCD 43, or commands corresponding to the finger-touched electrodes 442-444, 448 of the electrostatic sensors 44 disposed on the first and second side surfaces 431, 432 of the LCD frame 43. The present input processing control routine is executed when the LCD 41 is required to provide one of the function setting views, for example, the copying function setting view.

The input processing control routine of FIG. 7 is initiated with step S701 to determine whether the angle flag 23a is in the ON state. If the angle flag 23a is not in the ON state, that is, is in the OFF state, namely, if the LCD frame 43 has the first posture relatively close to the horizontal posture, a negative determination (NO) is obtained in the step S701, and the control flow goes to step S702 to provide the first input screen view on the LCD 41, and then to step S705.

If the angle flag 23a is in the ON state, that is, if the LCD frame 43 is obliquely inclined by an angle equal to or larger than the threshold angle, an affirmative determination (YES) is obtained in the step S701, and the control flow goes to step S703 to read out the information from the electrode assignment table of FIG. 4, to step S704 to provide the second input screen view on the LCD 41 according to the read-out information, and then to the above-indicated step S705.

Where the LCD 41 is required to provide the copying function setting view, for example, and the present input processing control routine is executed, and the LCD 41 provides the first input screen view shown in FIG. 5A if the angle flag 23a is placed in the OFF state, or the second input screen view shown in FIG. 5B if the angle flag 23a is placed in the ON state.

After the first or second input screen view is provided on the LCD 41, the step S705 is implemented to determine whether a signal generated by the touch panel 42 has been detected. If a negative determination (NO) is obtained in the step S705, the control flow goes to step S708. If an affirmative determination (YES) is obtained in the step S705, the control flow goes to step S706 to determine whether the angle flag 23a is in the ON state.

If an affirmative determination (YES) is obtained in the step S706, the control flow goes to step S707 to cancel the signal detected in the step S705, and then goes to the above-indicated step S708. Thus, it is not possible to input the signals by touching the touch panel 42, when the angle of the LCD frame 43 is equal to or larger than the threshold value, that is, when the LCD frame 43 has the second posture being obliquely inclined by a relatively large angle with respect to its horizontal posture in which the lower surface of the LCD frame 43 faces the upper surface of the base 5.

In this case, the desired commands can be correctly and easily inputted to the CPU 21 by touching the electrodes 442-444, 448 of the electrostatic sensors 44, rather than the button images displayed on the LCD 41.

If the angle flag 23a is in the OFF state, that is, if a negative determination (NO) is obtained in the step S706, the control flow goes to step S710 in which an input processing operation is performed according to the signal generated by the touch panel 42 and detected in the step S705, and one cycle of execution of the present input processing control routine is terminated. Thus, the signal generated by the touch panel 42 is validated, when the LCD frame 43 has the first posture relatively close to the horizontal posture.

In this case wherein the first and second side surfaces 431, 432 of the LCD frame 43 are located relatively close to the base 5 of the main body of the MFP 1, the electrodes 442-444, 448 of the electrostatic sensors 44 are relatively difficult to touch, and the signals generated by the touch panel 42 are validated, for easy and highly responsive input of the desired commands to the CPU 21.

The above-indicated step S708 is implemented to determine whether a signal generated by the electrostatic sensors 44 has been detected. If a negative determination (NO) is obtained in the step S708, the control flow goes back to the step S701. If an affirmative determination (YES) is obtained in the step S708, the control flow goes to step S709 to determine whether the angle flag 23*a* is in the ON state.

If the angle flag 23*a* is in the OFF state, that is, if a negative determination (NO) is obtained in the step S709, the control flow goes to step S711 in which the signal generated by the electrostatic sensors 44 and detected in the step S708 is canceled (invalidated), and then goes back to the step S701. Thus, it is not possible to input the signals by touching the electrodes 442-444, 448 of the electrostatic sensors 44, when the angle of the LCD frame 43 is smaller the threshold value, that is, when the LCD frame 43 has the first posture close to the horizontal posture in which the lower surface of the LCD 43 faces the upper surface of the base 5.

When the LCD frame has the first posture close to the horizontal posture, the desired commands can be easily inputted to the CPU 21 by touching the touch panel 42, with a high response to the finger touching action. If the electrodes 442-444, 448 as well as the touch panel 42 were also validated in this posture of the LCD frame, there may arise confusion in the processing of the signals generated by the touch panel 42 and the electrodes 442-444, 448. In view of this, only the touch panel 42 is validated when the angle flag 23*a* is in the OFF state.

If the angle flag 23*a* is in the ON state, an affirmative determination (YES) is obtained in the step S709, and the control flow goes to step S710 in which an input processing operation is performed according to the signal generated by the electrostatic sensors 44 and detected in the step S708, and one cycle of execution of the input processing control routine of FIG. 7 is terminated. That is, the signals generated by the electrostatic sensors 44 are validated when the LCD frame 43 is obliquely inclined by an angle equal to or larger than the threshold value.

When the LCD frame 43 is obliquely inclined by a relatively large angle equal to or larger than the threshold value, the operator has difficulty to finger touch the button images on the LCD 41, at a part of the finger between the tip and the first joint, but can correctly and easily touch the electrodes 442-444, 448 disposed on the side surfaces 431, 432 of the LCD frame 43, with a high response to the finger touching action, in a manner similar to the manner in which the operator touches the button images.

Figure 8:
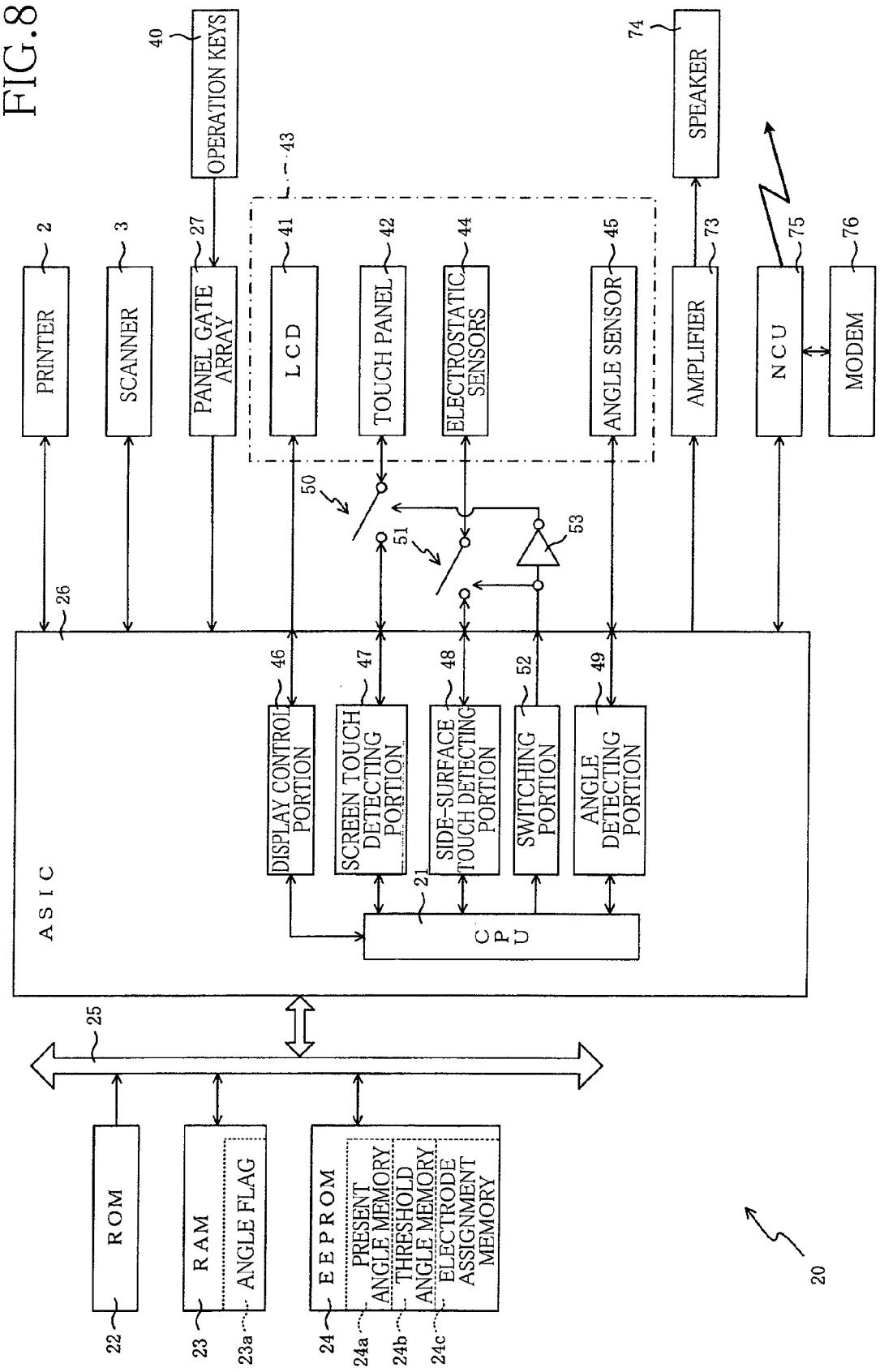
FIG. 8 is a block diagram schematically showing an arrangement of a control system of a multi-function peripheral constructed according to a second embodiment of this invention.
Figure 9:
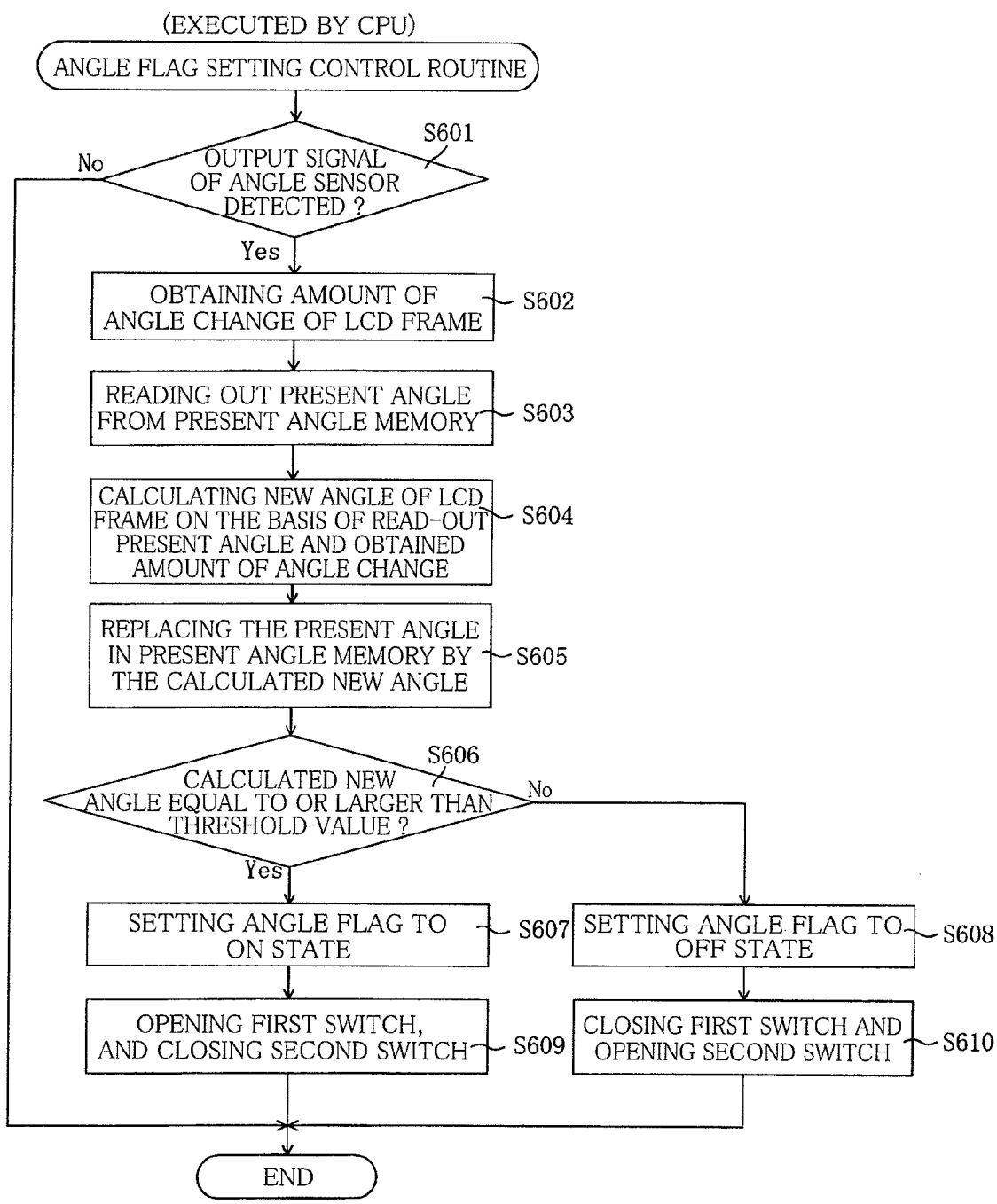
FIG. 9 is a flow chart illustrating an angle flag setting control routine executed in the second embodiment.

Referring next to FIGS. 8 and 9, a second embodiment of this invention will be described. FIG. 8 corresponds to FIG. 3, while FIG. 9 corresponds to FIG. 6. The same reference signs as used in FIGS. 3 and 6 will be used in FIGS. 8 and 9, to identify the corresponding elements or steps, which will not be described redundantly.

In the first embodiment, the touch panel 42 is connected to the screen touch detecting portion 47 of the ASIC 26, while the electrostatic sensors 44 are connected to the side-surface touch detecting portion 48 of the ASIC 26, so that the signals generated by the touch panel 42 and the signals generated by the electrostatic sensors 44 are once inputted to the detecting portions 47, 48. When the angle flag 23*a* is in the ON state, that is, when the angle of the LCD frame 43 is equal to or larger than the threshold value, the signals generated by the touch panel 42 are invalidated while the signals generated by the electrostatic sensors 44 are validated. When the angle flag 23*a* is in the OFF state, that is, when the angle of the LCD frame 43 is smaller than the threshold value, on the other hand, the signals generated by the electrostatic sensors 44 are invalidated while the signals generated by the touch panel 42 are validated.

In the second embodiment, the touch panel 42 is disconnected from the screen touch detecting portion 47 while the electrostatic sensors 44 are connected to the side-surface touch detecting portion 48, to permit only the signals generated by the electrostatic sensors 44 to be inputted to the ASIC 26, when the angle of the LCD frame 43 is equal to or larger than the threshold value, and the electrostatic sensors 44 are disconnected from the side-surface touch detecting portion 48 while the touch panel 42 is connected to the screen touch detecting portion 47, to permit only the signal generated by the touch panel 42 to be inputted to the ASIC 26, when the angle of the LCD frame 43 is smaller than the threshold value.

Reference is made to the block diagram of FIG. 8, there is shown a control portion 20 of the MFP 1, which is arranged according to the second embodiment of the invention. The control portion 20 of the present second embodiment is further provided with a first switch 50 for selectively connecting and disconnecting the touch panel 42 to and from the screen touch detecting portion 47, and a second switch 51 for selectively connecting and disconnecting the electrostatic sensors 44 to and from the side-surface touch detecting portion 48.

The ASIC 26 provided in the second embodiment further incorporates a switching portion 52 connected to the CPU 21. Between the switching portion 52 and the first switch 50, there is connected a NOT gate 53. The switching portion 52 generates a signal to be fed to the second switch 51 and the NOT gate 53, to selectively close and open the first switch 50 through the NOT gate 53, and to selectively close and open the second switch 51.

When the angle of the LCD frame 43 is equal to or larger than the threshold value, that is, when the angle flag 23*a* is in the ON state, an ON signal is fed from the switching portion 52 to the second switch 51 to close this second switch 51, for connecting the electrostatic sensors 44 to the side-surface touch detecting portion 48, while an OFF signal is fed from the NOT gate 53 to the first switch 50 to open this first switch 50, for disconnecting the touch panel 42 from the screen touch detecting portion 47.

Thus, the signals generated by the touch panel 42 are not permitted to be fed to the screen touch detecting portion 47, while only the signals generated by the electrostatic sensors 44 are permitted to be fed to the side-surface touch detecting portion 48, when the angle of the LCD frame 43 is equal to or larger than the threshold value, that is, when the angle flag 23*a* is in the ON state.

When the angle of the LCD frame 43 is smaller than the threshold value, that is, when the angle flag 23*a* is in the OFF state, on the other hand, an OFF signal is fed from the switching portion 52 to the second switch 51 to open this second switch 52, for disconnecting the electrostatic sensors 44 from the side-surface touch detecting portion 48, while an ON signal is fed from the NOT gate 53 to the first switch 50 to close this first switch 50, for connecting the touch panel 42 to the screen touch detecting portion 47.

Thus, the signals generated by the electrostatic sensors 44 are not permitted to be fed to the side-surface touch detecting portion 48, while only the signals generated by the touch panel 42 are permitted to be fed to the screen touch detecting portion 47, when the angle of the LCD frame 43 is smaller than the threshold value, that is, when the angle flag 23a is in the OFF state.

The flow chart of FIG. 9 illustrates an angle flag setting control routine executed in the second embodiment. When the angle flag 23a is set to the ON state in the step S607, the control flow goes to step S609 in which the ON signal is fed from the switching portion 52 to open the first switch 50 and close the second switch 51. When the angle flag 23a is set to the OFF state in the step S608, the control flow goes to step S610 in which the OFF signal is fed from the switching portion 52 to close the first switch 50 and open the second switch 51. One cycle execution of the present control routine is terminated with the step S609 or S610.

When the angle of the LCD 43 is equal to or larger than the threshold value, that is, when the angle flag 23a is in the ON state, the signals generated by the touch panel 42 are not permitted to be input to the ASIC 26, while only the signals generated by the electrostatic sensors 44 are permitted to be input to the ASIC 26. When the angle of the LCD 43 is smaller than the threshold value, that is, when the angle flag 23a is in the OFF state, the signals generated by the electrostatic sensors 44 are not permitted to be inputted to the ASIC 26, while only the signals generated by the touch panel 42 are permitted to the inputted to the ASIC 26.

Figure 10A:
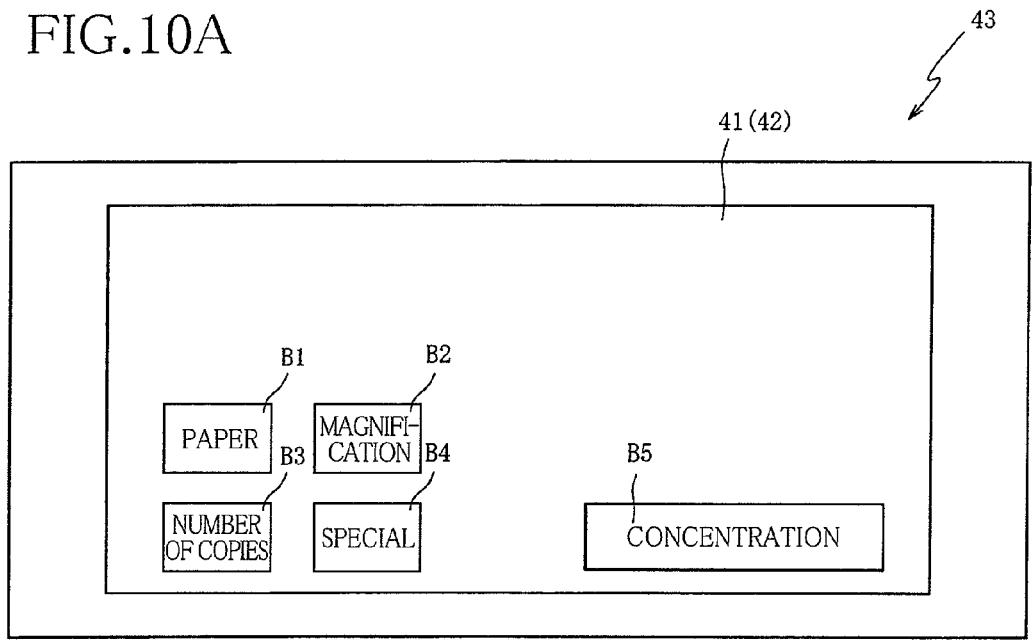
FIGS. 10A and 10B are views showing a modification of the first embodiment, 10A being identical with FIG. 5A, while FIG. 10B showing four electrodes disposed on a second side surface of the frame of the liquid crystal display, and indicating a second input screen view provided on the liquid crystal display when the angle of the frame is not smaller than the threshold value.
Figure 10B:
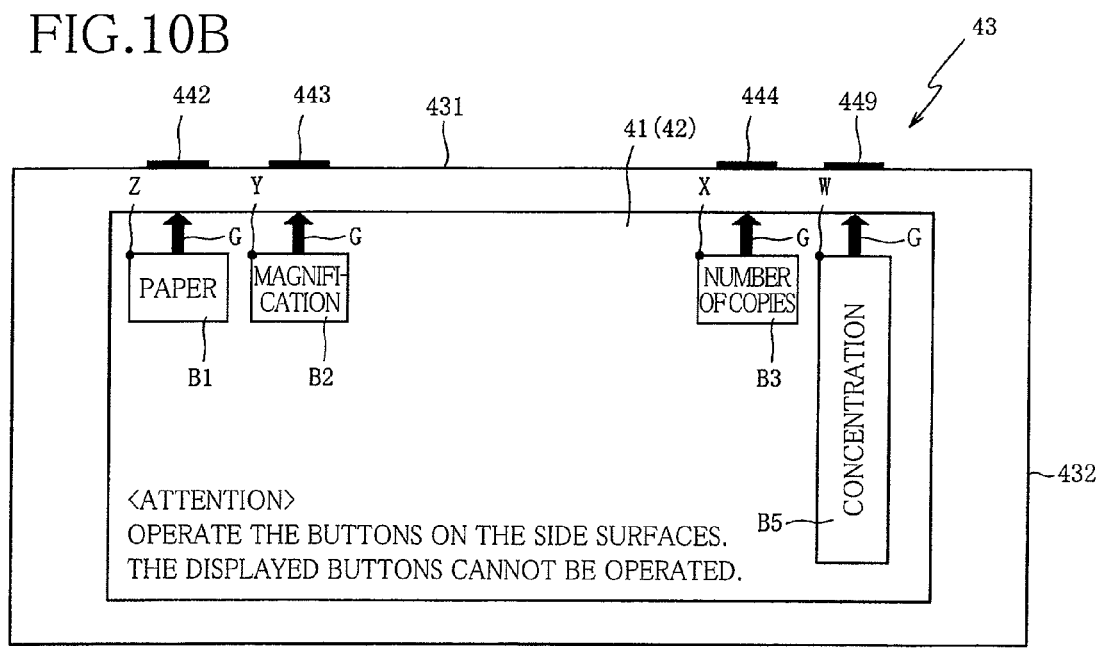

Referring next to FIGS. 10A and 10B, there will be described a modification of the first embodiment. This modification is different from the first embodiment, only in that a fourth electrode 449 corresponding to the CONCENTRATION button B5 is also disposed on the first side surface 431, rather than on the second side surface 432 on which the fourth electrode 448 is disposed in the first embodiment. In the other aspect, the this modification is identical with the first embodiment. When the angle of the LCD frame 43 is smaller than the threshold value, the LCD 41 provides the first input screen view as indicated in FIG. 10A. When the angle of the LCD frame 43 is equal to or larger than the threshold value, on the other hand, the LCD 41 provides the second input screen view as indicated in FIG. 10B. In the present modification, all of the four electrodes 442, 443, 444, 449 are disposed on the first side surface 431, and an arrow image G is displayed at a position adjacent to the CONCENTRATION button B5, such that the arrow image G extends upwards toward the fourth electrode 449, to indicate the position of the fourth electrode 449. Since the LCD frame 43 in the present modification has the four electrodes 442-444, 449 all of which are disposed on the first side surface 431, the LCD frame 43 can be easily accommodated in the recess formed in the operation panel 4, with a comparatively small gap between the second side surface 432 and the operation panel 4, in the absence of the fourth electrode 449 on the second side surface 432, unlike the LCD frame 43 in the first embodiment wherein the fourth electrode 448 is disposed on the second side surface 432.

While the preferred embodiments and the modification have been described above, it is to be understood that the present invention is not limited to the details of the illustrated embodiments, but may be embodied with various changes and modifications, without departing from the spirit and scope of the present invention.

In the illustrated embodiments and modification, the MFP 1 is provided with the input device constructed according to the present invention. However, the input device of the present invention may be provided in a copying apparatus, a facsimile apparatus, a telephone set apparatus or a digital camera apparatus, provided the input device is provided with elements corresponding to the LCD 41, touch panel 42, LCD frame 43 and electrostatic sensors 44.

In the illustrated embodiments and modification, the signals generated by the touch panel 42 and the signals generated by the electrostatic sensors 44 are selectively validated and invalidated depending upon whether the angle flag 23a is placed in the ON state or OFF state. However, both the signals of the touch panel 42 and the signals of the electrostatic sensors 44 can be always held valid so that the operator can finger touch the touch panel 42 or the electrodes of the electrostatic sensors 44, as needed. Although the first and second input screen views are selectively provided on the LCD 41 depending upon whether the flag 23a is in the ON state or OFF state, the two input screen views need not be selectively provided.

Further, the illustrated embodiments may be modified such that the touch panel 42 and the electrostatic sensors 44 are selectively turned on and off with selective power application and removal depending upon whether the flag 23a is in the ON state or OFF state, provided the signals of the touch panel 42 and the signals of the electrostatic sensors 44 are selectively validated and invalidated depending upon whether the flag 23a is in the ON state or OFF state. Namely, a power disconnecting portion may be provided to remove power from the touch panel 42 when the angle of the LCD frame 43 is equal to or larger than the threshold value, from the electrostatic sensors 44 when the angle of the LCD frame 43 is smaller than the threshold value. This modification is desirable for saving electric energy consumed by the MFP 1.

In the illustrated embodiment and modification, the LCD 41 does not display button images corresponding to buttons to which no electrode is assigned in the electrode assignment table of FIG. 4. However, those button images may be displayed on the LCD 41, to permit the operator to input the corresponding commands through the touch panel 42, that is, to finger-touch the button images displayed on the LCD 41.

In the illustrated embodiments and modification, the LCD frame 43 are pivotable relative to the operation panel 4 and the base 5. However, the LCD frame 43 may be moved relative to the operation panel 4 and the base 5, so as to have the first angular position in which the LCD frame 43 has a posture relatively close to the horizontal posture, and the second angular position in which the LCD frame 43 has a posture relatively close to the upright posture.

In the illustrated embodiments and modification, the angle sensor 45 is provided to detect the angle of the LCD frame 43 for determining whether the LCD frame 43 has the above-indicated first posture or second posture. However, the angle sensor 45 may be replaced by a contact sensor which is configured such that the contact sensor is held in contact with the LCD frame 43 when the LCD frame 43 has one of the above-indicated first and second postures, and is held apart from the LCD frame 43 when the LCD frame 53 has the other of the first and second postures.

What is claimed is:
1. An input device comprising:
  a frame in the form of a rectangular parallelepiped body which is supported by a base and which is movable between a first angular position in which an angle of a lower surface of the frame with respect to a horizontal upper surface of the base is smaller than a predetermined threshold value, and a second angular position in which the angle of the lower surface of the frame as seen in the first angular position with respect to the horizontal upper surface of the base is not smaller than the threshold value;

a first input portion disposed on a surface of the frame, which surface is an upper surface of the frame as seen when the frame has a horizontal posture in the first angular position, in which a lower surface of the frame is parallel to said horizontal upper surface of the base;

a second input portion disposed on a surface of the frame, which surface is a side surface of the frame as seen when the frame has said horizontal posture;

a detecting portion configured to detect an operation by an operator of the input device on at least one of the first and second input portions; and an angular-position determining portion configured to determine whether the frame is placed in the first angular position or the second angular position, wherein the detecting portion invalidates an input operation on the first input portion when the angular-position determining portion has determined that the frame is placed in the second angular position.

2. The input device according to claim 1, wherein the first input portion includes a display portion configured to display command images for inputting respective commands, on the surface of the frame on which the first input portion is disposed, and the detecting portion is configured to detect a contact of an operator of the input device with a selected one of the command images, or an approach of the operator to the selected command image, as an input of the selected command.

3. The input device according to claim 2, wherein the second input portion includes electrodes provided on the surface of the frame on which the second input portion is disposed, and the detecting portion is configured to detect a contact of the operator with a selected one of the electrodes, or an approach of the operator to the selected electrode, as an input of a command corresponding to the selected electrode.

4. The input device according to claim 3, further comprising a display control portion configured to control the display portion to display electrode-position indicating images indicative of positions of the electrodes, when the frame is placed in the second angular position.

5. The input device according to claim 4, wherein the electrode-position indicating images are images of arrows extend from positions of said command images on the display portion toward the positions of the electrodes.

6. The input device according to claim 4, wherein the display control portion controls the display portion to display the electrode-position indicating images such that the displayed electrode-position indicating images are respectively related with said command images displayed on the display portion.

7. The input device according to claim 6, further comprising a display-position memory portion which stores information indicative of a relationship of the electrodes with said command images and the positions of the command images on the display portion, and the display control portion controls the display portion to display the electrode-position indicating images on the basis of the information stored in the display-position memory portion such that the displayed electrode-position indicating images are related with the command images.

8. The input device according to claim 3, wherein the base has a recess in which the frame is accommodated when the frame has the horizontal posture in the first angular position, and the side surface of the frame as seen when the frame has the horizontal posture has a gripping region at which the operator can grip the frame while the frame is accommodated in the recess, and where the electrodes are located in a region of said side surface other than said gripping region.

9. The input device according to claim 8, wherein the surface of the frame on which the display portion of the first input portion is disposed is a rectangular surface, and the surface of the frame on which the electrodes are disposed includes a first elongate surface extending in a longitudinal direction of the rectangular surface, the electrodes being disposed on the such that the gripping region is located in a central region of the first elongate surface as seen in a longitudinal direction of the first elongate surface.

10. The input device according to claim 9, wherein the surface of the frame on which the electrodes are disposed further includes a second elongate surface parallel to a transverse direction of the rectangular surface and perpendicular to the first elongate surface, and the electrodes are disposed on the first and second elongate surfaces.

11. The input device according to claim 10, wherein all of the electrodes are disposed in the first elongate surface.

12. The input device according to claim 1, wherein the angular-position determining portion includes an angle sensor configured to detect the angle of the lower surface of the frame as seen in the first angular position with respect to the horizontal upper surface of the base, and the detecting portion invalids the input operation on the first input portion when the angle of the lower surface detected by the angle sensor is not smaller than the threshold value.

13. The input device according to claim 1, further comprising an angular-position determining portion configured to determine whether the frame is placed in the first angular position or the second angular position, and a power disconnecting portion configured to remove power from the first input portion when the angular-position determining portion has determined that the frame is placed in the second angular position.

14. The input device according to claim 1, further comprising an angular-position determining portion configured to determine whether the frame is placed in the first angular position or the second angular position, and wherein the detecting portion invalidates an input operation on the second input portion when the angular-position determining portion has determined that the frame is placed in the first angular position.

15. The input device according to claim 1, further comprising an angular-position determining portion configured to determine whether the frame is placed in the first angular position or the second angular position, and a power disconnecting portion configured to remove power from the second input portion when the angular-position determining portion has determined that the frame is placed in the first angular position.

16. The input device according to claim 1, wherein the detecting portion validates an input operation on the second input portion when an input operation on the first input portion is invalidated, and invalidates the input operation on the second input portion when the input operation on the first input portion is validated.

17. A multi-function peripheral provided with an input device as defined in claim 1.

18. An input device comprising:

a frame in the form of a rectangular parallelepiped body which is supported by a base and which is movable between a first angular position in which an angle of a lower surface of the frame with respect to a horizontal upper surface of the base is smaller than a predetermined threshold value, and a second angular position in which the angle of the lower surface of the frame as seen in the first angular position with respect to the horizontal upper surface of the base is not smaller than the threshold value;

a first input portion disposed on a surface of the frame, which surface is an upper surface of the frame as seen when the frame has a horizontal posture in the first angular position, in which a lower surface of the frame is parallel to said horizontal upper surface of the base;

a second input portion disposed on a surface of the frame, which surface is a side surface of the frame as seen when the frame has said horizontal posture;

a detecting portion configured to detect an operation by an operator of the input device on at least one of the first and second input portions; and an angular-position determining portion configured to determine whether the frame is placed in the first angular position or the second angular position, wherein the detecting portion invalidates an input operation on the second input portion when the angular-position determining portion has determined that the frame is placed in the first angular position.

19. The input device according to claim 18, wherein the angular-position determining portion includes an angle sensor configured to detect the angle of the lower surface of the frame as seen in the first angular position with respect to the horizontal upper surface of the base, and the detecting portion invalids the input operation on the second input portion when the angle of the lower surface detected by the angle sensor is smaller than the threshold value.

20. An input device comprising:

a frame in the form of a rectangular parallelepiped body which is supported by a base and which is movable between a first angular position in which an angle of a lower surface of the frame with respect to a horizontal upper surface of the base is smaller than a predetermined threshold value, and a second angular position in which the angle of the lower surface of the frame as seen in the first angular position with respect to the horizontal upper surface of the base is not smaller than the threshold value;

a first input portion disposed on a surface of the frame, which surface is an upper surface of the frame as seen when the frame has a horizontal posture in the first angular position, in which a lower surface of the frame is parallel to said horizontal upper surface of the base;

a second input portion disposed on a surface of the frame, which surface is a side surface of the frame as seen when the frame has said horizontal posture; and a detecting portion configured to detect an operation by an operator of the input device on at least one of the first and second input portions, wherein the detecting portion validates an input operation on the second input portion when an input operation on the first input portion is invalidated, and invalidates the input operation on the second input portion when the input operation on the first input portion is validated.

* * * * *